United States Patent
Uchida

(10) Patent No.: US 9,903,583 B2
(45) Date of Patent: Feb. 27, 2018

(54) DEVICE FOR PREVENTING STEAM FROM BEING PRODUCED IN FLUE GAS COOLER FOR OXYFUEL COMBUSTION BOILER

(71) Applicant: IHI Corporation, Koto-ku (JP)

(72) Inventor: Terutoshi Uchida, Koto-ku (JP)

(73) Assignee: IHI Corporation, Koto-ku (JP)

( * ) Notice: Subject to any disclaimer, the term of this patent is extended or adjusted under 35 U.S.C. 154(b) by 174 days.

(21) Appl. No.: 15/053,014

(22) Filed: Feb. 25, 2016

(65) Prior Publication Data

US 2016/0169504 A1 Jun. 16, 2016

Related U.S. Application Data

(63) Continuation of application No. PCT/JP2014/074000, filed on Sep. 10, 2014.

(30) Foreign Application Priority Data

Sep. 18, 2013 (JP) .................................. 2013-192549

(51) Int. Cl.
*F22D 1/12* (2006.01)
*F23J 15/06* (2006.01)
(Continued)

(52) U.S. Cl.
CPC .................. *F22D 1/12* (2013.01); *F01K 5/00* (2013.01); *F01K 13/02* (2013.01); *F22B 1/02* (2013.01);
(Continued)

(58) Field of Classification Search
CPC ... F22D 1/12; F22D 1/14; F22D 11/04; F23B 5/02
See application file for complete search history.

(56) References Cited

U.S. PATENT DOCUMENTS 5,673,634 A * 10/1997 Karger .................... F01K 23/10
110/234
2004/0025503 A1* 2/2004 Hattori ...................... F01K 9/04
60/517
2009/0293782 A1* 12/2009 Eriksson ............... F22B 35/002
110/205

(Continued)

FOREIGN PATENT DOCUMENTS

JP          9-133308       5/1997
JP          2009-8365      1/2009

(Continued)

OTHER PUBLICATIONS

English Translation of International Search Report dated Dec. 9, 2014 in PCT/JP2014/074000, filed Sep. 10, 2014.

*Primary Examiner* — Nathaniel Herzfeld
(74) *Attorney, Agent, or Firm* — Oblon, McClelland, Maier & Neustadt, L.L.P.

(57) ABSTRACT

A feed-water discharge side of a condenser is connected to a feed-water entry side of an flue gas cooler through a bypass line provided with a steam production preventive pump and with an inlet cutoff valve. A feed-water discharge side of the flue gas cooler is connected to the feed-water entry side of the condenser through a steam production preventive water circulation line provided with an outlet cutoff valve. When a boiler feed-water pump is stopped in boiler fuel cutoff, the inlet and outlet cutoff valves are opened and the steam production preventive pump is activated to cause water to flow through the bypass line into the flue gas cooler, is returned through the steam production preventive water circulation line to the condenser and is circulated.

3 Claims, 3 Drawing Sheets

(51) Int. Cl.
*F01K 13/02* (2006.01)
*F22B 1/02* (2006.01)
*F23L 7/00* (2006.01)
*F23C 9/00* (2006.01)
*F22D 1/14* (2006.01)
*F22D 11/04* (2006.01)
*F23B 30/00* (2006.01)
*F01K 5/00* (2006.01)

(52) U.S. Cl.
CPC ............... *F22D 1/14* (2013.01); *F22D 11/04* (2013.01); *F23B 5/02* (2013.01); *F23C 9/00* (2013.01); *F23J 15/06* (2013.01); *F23L 7/007* (2013.01); *Y02E 20/344* (2013.01); *Y02E 20/363* (2013.01)

(56) References Cited

U.S. PATENT DOCUMENTS

| | | | |
|---|---|---|---|
| 2011/0045421 A1* | 2/2011 | Yamada | F22B 35/002 431/12 |
| 2012/0067048 A1* | 3/2012 | Mishima | F01K 23/06 60/670 |
| 2012/0324893 A1* | 12/2012 | Hayashi | F01K 7/40 60/691 |

FOREIGN PATENT DOCUMENTS

| | | |
|---|---|---|
| JP | 2011-190696 | 9/2011 |
| JP | 2012-67927 | 4/2012 |
| JP | 2012-137269 | 7/2012 |

* cited by examiner

12
DEVICE FOR PREVENTING STEAM FROM BEING PRODUCED IN FLUE GAS COOLER FOR OXYFUEL COMBUSTION BOILER

TECHNICAL FIELD

The present disclosure relates to a device for preventing steam from being produced in an flue gas cooler for an oxyfuel combustion boiler.

BACKGROUND ART

Coal-fired power generation equipment using a pulverized coal-fired boiler has occupied an important role due to, for example, a recent situation of escalating prices of petroleum and natural gas resulting from increased demand therefor. Conventionally, an air combustion boiler using air as combustion support gas has been generally used as a pulverized coal-fired boiler.

Coal combustion itself has a problem of much $CO_2$ emission in comparison with petroleum or natural gas combustion. Thus, increased emission of $CO_2$ due to increased dependence on coal fire power is a serious problem to be solved from a viewpoint of preventing global warming.

The air combustion boiler, which contains much nitrogen in flue gas, has a problem that troublesome is separation and withdrawal of nitrogen and $CO_2$ from the flue gas.

Thus, an oxyfuel combustion boiler draws attention as means for substantially reducing $CO_2$ emission to atmosphere and development thereof has been advanced.

Employed in the oxyfuel combustion boiler is flue gas recirculation in which most of combustion flue gas from the oxyfuel combustion boiler for burning pulverized coal is extracted midway from a gas flue; the flue gas extracted and mixed with oxygen produced in an oxygen production unit and adjusted to have a proper oxygen concentration is supplied as combustion support gas to the oxyfuel combustion boiler. According to the flue gas recirculation type oxyfuel combustion boiler, no nitrogen is contained in the flue gas to dramatically enhance a $CO_2$ concentration in the flue gas finally discharged, which facilitates separation and withdrawal of $CO_2$ from the flue gas.

There is, for example, the following Patent Literature 1 as a general conventional art literature pertinent to the oxyfuel combustion boiler as mentioned above.

CITATION LIST

Patent Literature

Patent Literature 1: JP 2012-67927A

SUMMARY

Technical Problems

In the oxyfuel combustion boiler, an air preheater, which conducts heat exchange of the flue gas with primary and secondary airs (recirculation gas and a mixture of the recirculation gas with oxygen in the case of oxyfuel combustion) for transportation of pulverized coal and for combustion, respectively, has an outlet gas temperature on the order of about 260° C. which is higher than that in a normal air combustion boiler. A dust removing device (such as a bag filter or an electrical dust collector) arranged downstream of the air preheater in a direction of a flow of the flue gas has to have an inlet temperature adjusted to less than 260° C. (about 135° C. in the case of the bag filter and about 85° C. in the case of the electric dust collector).

To this end, arranged between the air preheater and the dust removing device is an flue gas cooler which cools the outlet gas temperature on the order of about 260° C. to the temperature required for the dust removing device. As a cooling medium for the flue gas cooler, use of low-pressure feed-water with a temperature on the order of about 70-100° C. is effective from viewpoints of the temperature condition and efficiency gain due to heat recovery.

When boiler fuel cutoff (MFT: master fuel trip) occurs for some reason, a boiler feed-water pump stops a little later after the boiler fuel cutoff so that a flow of the low-pressure feed-water into the flue gas cooler also stops. In this case, heat exchange with high-temperature flue gas not instantly stopped after the boiler fuel cutoff heats the low-pressure feed-water dwelling in the flue gas cooler to produce steam. When the produced steam quickly condenses again, disadvantageously, drains may collide with each other to bring about water hammering and adversely affect piping, valves and the like.

The disclosure was made in view of the above-mentioned conventional problems and has its object to provide a device for preventing steam from being produced in an flue gas cooler for an oxyfuel combustion boiler which can preliminarily prevent steam from being produced in the flue gas cooler due to heat exchange with high-temperature flue gas.

Solution to Problems

The disclosure is directed to a device for preventing steam from being produced in an flue gas cooler for an oxyfuel combustion boiler with a boiler low-pressure feed-water system comprising a condenser, a condensate pump, a low-pressure feed-water heater and a boiler feed-water pump in the order named and wherein, in oxyfuel combustion, part of the low-pressure feed-water boosted in pressure by the condensate pump in the boiler low-pressure feed-water system is sent under pressure by a booster pump to the flue gas cooler where the low-pressure feed-water heat exchanged with flue gas is guided again to the boiler low-pressure feed-water system, comprising a bypass line for connecting a feed-water discharge side of the condenser with a feed-water entry side of the flue gas cooler by bypassing the condensate and booster pumps, a steam production preventive pump in the bypass line, an inlet cutoff valve in the bypass line, a steam production preventive water circulation line for connecting a feed-water discharge side of the flue gas cooler with a feed-water entry side of the condenser and an outlet cutoff valve in the steam production preventive water circulation line, when the boiler feed-water pump stops in boiler fuel cutoff, the inlet and outlet cutoff valves being opened and the steam production preventive pump being activated to cause water to flow through the bypass line to the flue gas cooler and return and circulate through the steam production preventive water circulation line to the condenser.

It is preferable that the device for preventing steam from being produced in the flue gas cooler for the oxyfuel combustion boiler further comprises a gas temperature gauge for measuring an inlet gas temperature of the flue gas cooler, a feed-water pressure gauge for measuring an outlet feed-water pressure of the flue gas cooler and a controller for outputting opening signals to the inlet and outlet cutoff valves, respectively, and a start signal to the steam production preventive pump when the inlet gas temperature measured by the gas temperature gauge exceeds an outlet feed-water saturation temperature based on the outlet feed-water pressure measured by the feed-water pressure gauge and a boiler fuel cutoff signal is inputted.

It is preferable that it further comprises a feed-water temperature gauge for measuring an outlet feed-water temperature of the flue gas cooler, the controller being adapted to output the opening signals to the inlet and outlet cutoff valves, respectively, and the start signal to the steam production preventive pump when the outlet feed-water temperature measured by the feed-water temperature gauge exceeds the outlet feed-water saturation temperature based on the outlet feed-water pressure measured by the feed-water pressure gauge.

Advantageous Effect

A device for preventing steam from being produced in an flue gas cooler for an oxyfuel combustion boiler according to the disclosure can exhibit an excellent effect that steam can be preliminarily prevented from being produced in the flue gas cooler due to heat exchange with high-temperature flue gas.

DESCRIPTION OF EMBODIMENT

Next, an embodiment of the disclosure will be described in conjunction with the attached drawings.

Figure 1:
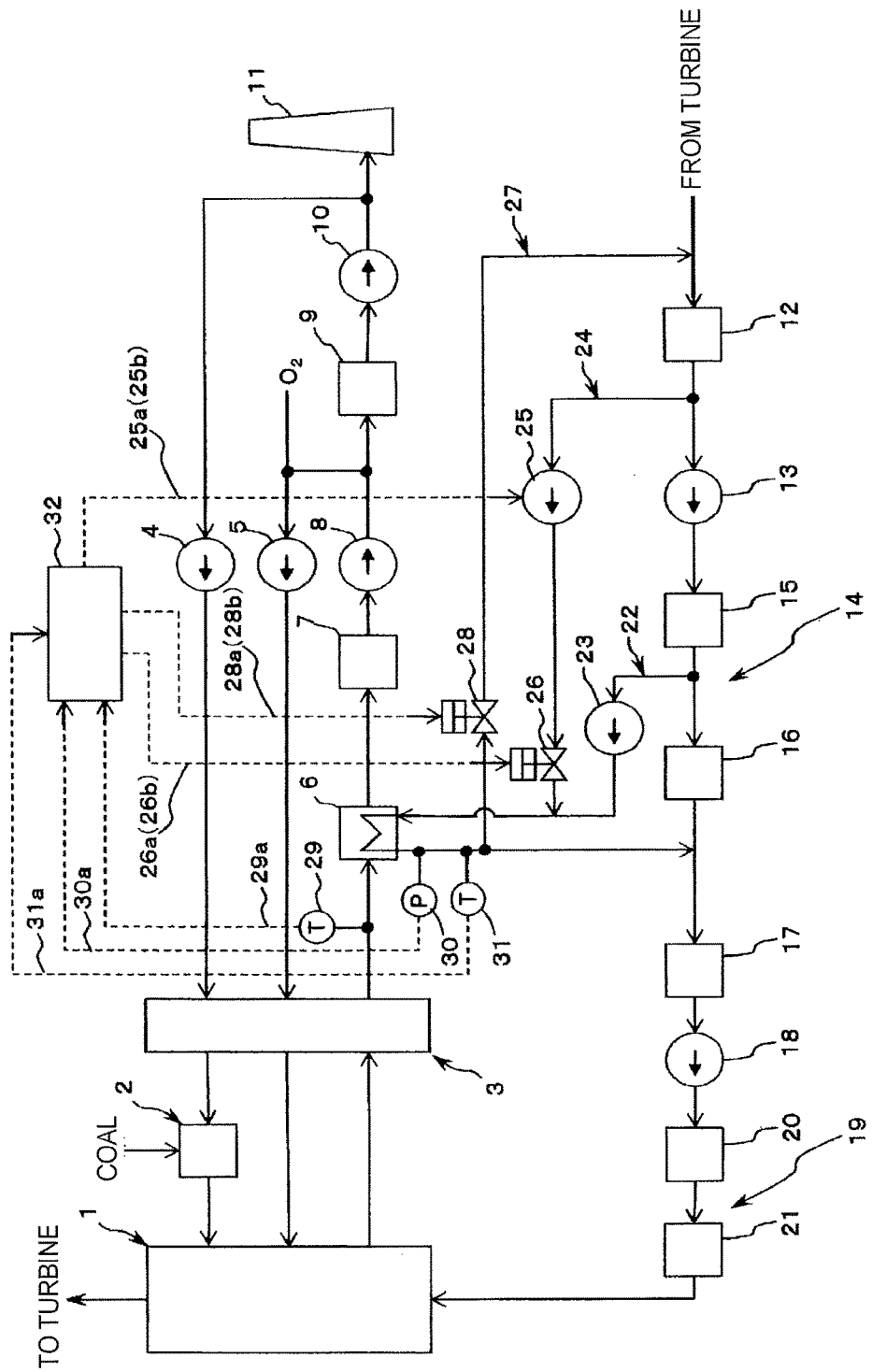
FIG. 1 is an overall schematic diagram showing an embodiment of a device for preventing steam from being produced in an flue gas cooler for an oxyfuel combustion boiler according to the disclosure.
Figure 2:
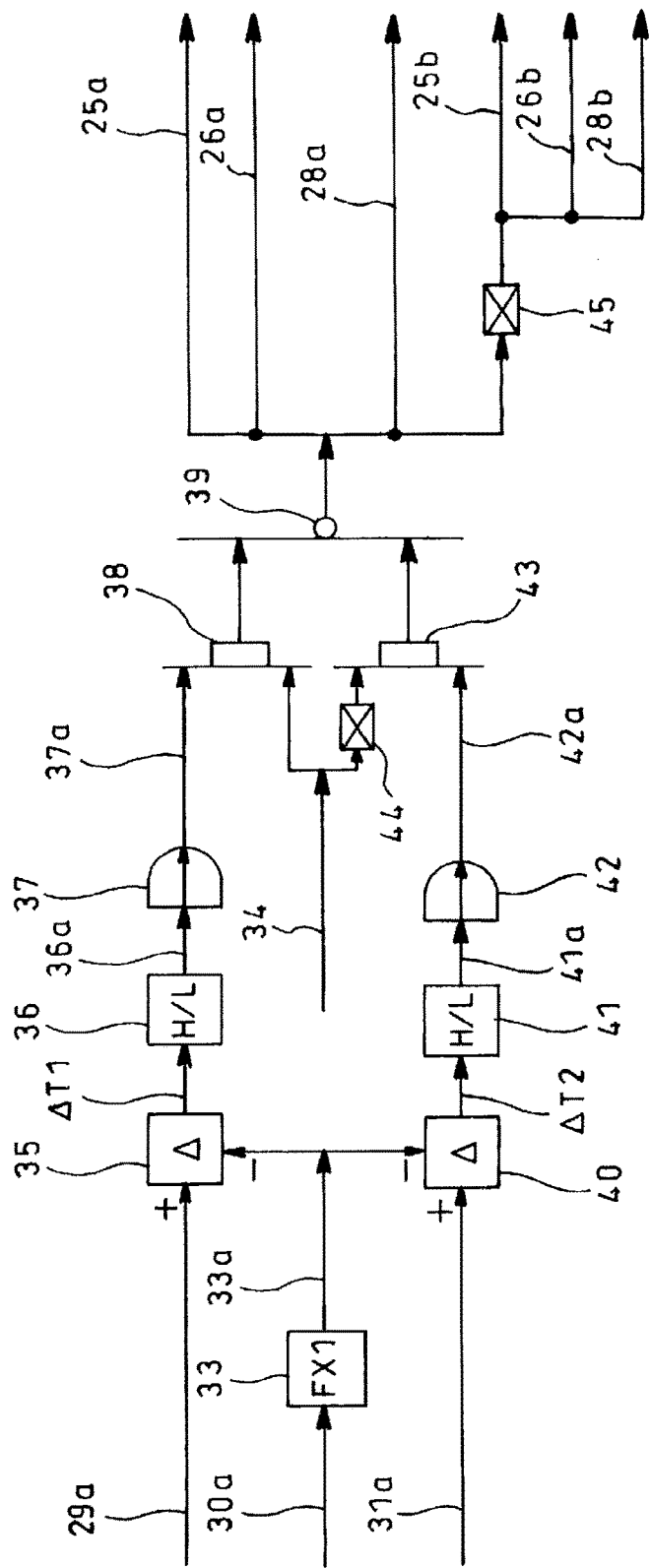
FIG. 2 is a control block diagram showing the embodiment of the device for preventing steam from being produced in the flue gas cooler for the oxyfuel combustion boiler according to the disclosure.
Figure 3:
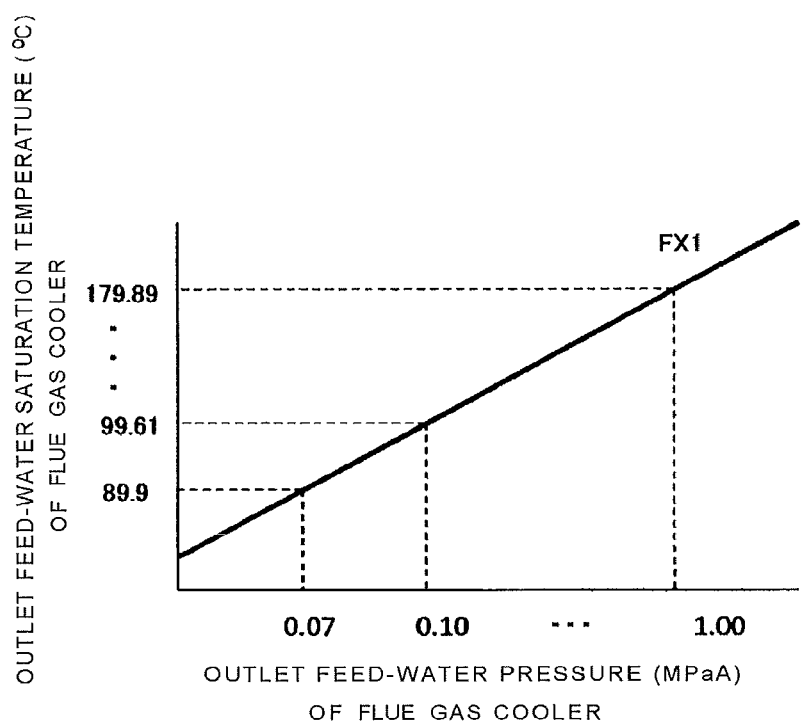
FIG. 3 is a diagrammatic view showing a function set to a function generator in the embodiment of the device for preventing steam from being produced in the flue gas cooler for the oxyfuel combustion boiler according to the disclosure.

FIGS. 1-3 show the embodiment of a device for preventing steam from being produced in an flue gas cooler for an oxyfuel combustion boiler according to the disclosure. Reference numeral 1 denotes a boiler body; 2, a mill pulverizing coal and supplying the pulverized coal to the boiler body 1; and 3, an air preheater heat exchanging combustion flue gas from the boiler body 1 with primary and secondary airs for transportation of the pulverized coal and for combustion, respectively.

The pulverized coal pulverized in the mill 2 is burned in the boiler body 1 and combustion flue gas from the boiler body 1 is heat exchanged in the air preheater 3 with primary and secondary airs (recirculation gas and a mixture of the recirculation gas with oxygen in the case of oxyfuel combustion) fed under pressure by primary and forced draft fans 4 and 5, respectively.

The combustion flue gas heat exchanged in the air preheater 3 is heat exchanged with low-pressure feed-water in an flue gas cooler 6, is made free from dust in a bag filter 7, is passed through an induced draft fan 8 and is introduced into a desulfurizing and dewatering device 9 while part thereof is sent as recirculation gas to an entry side of the forced draft fan 5 so as to be mixed with the oxygen.

The combustion flue gas introduced into the desulfurizing and dewatering device 9 is desulfurized and dewatered in the desulfurizing and dewatering device 9, is passed through a desulfurizing draft fan 10 and is discharged to $CO_2$ processing facility which is not shown in the figure while part thereof is sent as recirculation gas to an entry side of the primary draft fan 4.

Steam produced in the boiler body 1 is introduced into and drives a turbine (not shown) to generate electricity. The steam after driving the turbine is introduced into a condenser 12 and is returned to the boiler feed-water. The boiler feed-water is sent under pressure by a condensate pump 13, is heated by a plurality of (two in FIG. 1) low-pressure feed-water heaters 15 and 16 in a boiler low-pressure feed-water system 14 and is deaerated by a deaerator 17. The low-pressure feed-water deaerated by the deaerator 17 is sent under pressure by a boiler feed-water pump 18 and is heated by a plurality of (two in FIG. 1) high-pressure feed-water heaters 20 and 21 in a boiler high-pressure feed-water system 19 into high-pressure feed-water which is returned for circulation to the boiler body 1.

The low-pressure feed-water is passed through a low-pressure feed-water branch line 22 branched from a discharge side of the first low-pressure feed-water heater 15 and is boosted in pressure by a booster pump 23 into the flue gas cooler 6. The low-pressure feed-water heat-exchanged in the flue gas cooler 6 with the flue gas is joined to a discharge side of the second low-pressure feed-water heater 16.

In the embodiment, a feed-water discharge side of the condenser 12 is connected to a feed-water entry side of the flue gas cooler 6 by a bypass line 24 in a manner of bypassing the condensate and booster pumps 13 and 23. The bypass line 24 is provided with a steam production preventive pump 25 and an inlet cutoff valve 26. A feed-water discharge side of the flue gas cooler 6 is connected to a feed-water entry side of the condenser 12 through a steam production preventive water circulation line 27 having an outlet cutoff valve 28.

Arranged on an flue gas entry side of the flue gas cooler 6 is a gas temperature gauge 29 for measurement of an inlet gas temperature 29a of the flue gas cooler 6. Arranged on a feed-water discharge side of the flue gas cooler 6 are feed-water pressure and temperature gauges 30 and 31 for measurement of outlet feed-water pressure and temperature 30a and 31a of the flue gas cooler 6, respectively.

In FIG. 1, reference numeral 32 denotes a controller which outputs opening signals 26a and 28a to the inlet and outlet cutoff valves 26 and 28, respectively, and a start signal 25a to the steam production preventive pump 25 when an inlet gas temperature 29a measured by the gas temperature gauge 29 exceeds an outlet feed-water saturation temperature 33a (see FIG. 2) based on the outlet feed-water pressure 30a measured by the feed-water pressure gauge 30 and a boiler fuel cutoff (MFT: master fuel trip) signal 34 is inputted. More specifically, as shown in FIG. 2, the outlet feed-water saturation temperature 33a based on the outlet feed-water pressure 30a is obtained by a function generator 33. Set in the function generator 33 is a function representative of a correspondence relationship between the outlet feed-water pressure 30a in abscissa and the outlet feed-water saturation temperature 33a in ordinate as shown in FIG. 3. A deviation ΔT1 of the inlet gas temperature 29a from the outlet feed-water saturation temperature 33a is obtained by a subtractor 35. The deviation ΔT1 obtained by the subtractor 35 is inputted to a high-low monitor switch 36. If ΔT1>0, the high-low monitor switch 36 outputs a signal 36a of "1" to an on-delay timer 37; if ΔT1≤0, the signal 36a of "0" to the on-delay timer 37. If the signal 36a of "1" is continuously outputted from the high-low monitor switch 36 to the on-delay timer 37 over a predetermined time period, a signal 37a of "1" is outputted from the on-delay timer 37 to an AND circuit 38 after the predetermined time period passes. In a situation that an operation of the boiler body 1 is to be urgently stopped, a boiler fuel cutoff signal 34 is inputted to the AND circuit 38; concurrently, if the signal 37a of "1" is outputted from the on-delay timer 37, the AND circuit 38 outputs through an OR circuit 39 opening signals 26a and 28a to the inlet and outlet cutoff valves 26 and 28, respectively, and a start signal 25a to the steam production preventive pump 25.

The controller 32 also outputs the opening signals 26a and 28a to the inlet and outlet cutoff valves 26 and 28, respectively, and the start signal 25a to the steam production preventive pump 25 when the outlet feed-water temperature 31a measured by the feed-water temperature gauge 31 exceeds the outlet feed-water saturation temperature 33a based on the outlet feed-water pressure 30a measured by the feed-water pressure gauge 30. More specifically, as shown in FIG. 2, a deviation ΔT2 of the outlet feed-water temperature 31a from the outlet feed-water saturation temperature 33a is obtained by a subtractor 40. The deviation ΔT2 obtained by the subtractor 40 is inputted to a high-low monitor switch 41. If ΔT2>0, the high-low monitor switch 41 outputs a signal 41a of "1" to an on-delay timer 42; if ΔT2≤0, the signal 41a of "0" to the on-delay timer 42. If the signal 41a of "1" is continuously outputted from the high-low monitor switch 41 to the on-delay timer 42 over a predetermined time period, a signal 42a of "1" is outputted from the on-delay timer 42 to an AND circuit 43 after the predetermined time period passes. To the AND circuit 43, the boiler fuel cutoff signal 34 is inputted through a NOT circuit 44; specifically, in a situation that the operation of the boiler body 1 is not to be urgently stopped (the boiler fuel cutoff signal 34 is "0" and the signal outputted from the NOT circuit 44 is "1") and if the signal of "1" is outputted from the on-delay timer 42, outputted from the AND circuit 43 through the OR circuit 39 are the opening signals 26a and 28a to the inlet and outlet cutoff valves 26 and 28, respectively, and the start signal 25a to the steam production preventive pump 25.

When the signal outputted from the OR circuit 39 is "0", i.e., both of the signals outputted from the AND circuits 38 and 43 are "0", outputted through a NOT circuit 45 are closing signals 26b and 28b to the inlet and outlet cutoff valves 26 and 28, respectively, and a stop signal 25b to the steam production preventive pump 25.

Next, mode of operation of the above embodiment will be described.

Upon oxyfuel combustion in the boiler body 1, the low-pressure feed-water is guided to the flue gas cooler 6, by an operation of the booster pump 23, through the low-pressure feed-water branch line 22 in a manner branched from the discharge side of the first low-pressure feed-water heater 15; the low-pressure feed-water heat exchanged with the flue gas in the flue gas cooler 6 is joined to the discharge side of the second low-pressure feed-water heater 16. In this case, the inlet gas temperature 29a, the outlet feed-water pressure 30a and the outlet feed-water temperature 31a are measured by the gas temperature gauge 29, the feed-water pressure gauge 30 and the feed-water temperature gauge 31, respectively, and are inputted to the controller 32.

In the controller 32, as shown in FIG. 2, the outlet feed-water saturation temperature 33a is obtained by the function generator 33 on the basis of the outlet feed-water pressure 30a. The deviation ΔT1 of the inlet gas temperature 29a from the outlet feed-water saturation temperature 33a is obtained by the subtractor 35. The deviation ΔT1 obtained by the subtractor 35 is inputted to the high-low monitor switch 36. If ΔT1>0, the high-low monitor switch 36 outputs the signal 36a of "1" to the on-delay timer 37. When the signal 36a of "1" is continuously outputted from the high-low monitor switch 36 to the on-delay timer 37 over the predetermined time period, the signal 37a of "1" is outputted from the on-delay timer 37 to the AND circuit 38 after the predetermined time period passes. In the situation that the operation of the boiler body 1 is to be urgently stopped, the boiler fuel cutoff signal 34 is inputted to the AND circuit 38; concurrently, if the signal 37a of "1" is outputted from the on-delay timer 37, the AND circuit 38 outputs through the OR circuit 39 the opening signals 26a and 28a to the inlet and outlet cutoff valves 26 and 28, respectively, and the start signal 25a to the steam production preventive pump 25.

In this case, even if the boiler feed-water pump 18 stops a little later after the boiler fuel cutoff, the inlet and outlet cutoff valves 26 and 28 has been opened and the steam production preventive pump 25 has been activated. Thus, the low-pressure feed-water is fed from the bypass line 24 through the branch line 22 into the flue gas cooler 6, is returned through the steam production preventive water circulation line 27 to the feed-water entry side of the condenser 12, is cooled in the condenser 12 and is circulated so that it is prevented from dwelling in the flue gas cooler 6. As a result, the low-pressure feed-water is prevented from being heated in the flue gas cooler 6 to produce any steam by heat exchange with the high-temperature flue gas not instantly stopped after the boiler fuel cutoff, which brings about no water hammering and there is no adverse effect on piping, valves and the like.

The provision of the controller 32, which outputs the opening signals 26a and 28a to the inlet and outlet cutoff valves 26 and 28, respectively, and the start signal 25a to the steam production preventive pump 25 when the inlet gas temperature 29a measured by the gas temperature gauge 29 exceeds the outlet feed-water saturation temperature 33a based on the outlet feed-water pressure 30a measured by the feed-water pressure gauge 30 and the boiler fuel cutoff signal 34 is inputted, is effective for reliable prevention of steam production in comparison with detecting steam production from the low-pressure feed-water merely on the basis of presence or absence of the boiler fuel cutoff signal 34.

In the controller 32, as shown in FIG. 2, the deviation ΔT2 of the outlet feed-water temperature 31a from the outlet feed-water saturation temperature 33a is obtained by the subtractor 40. The deviation ΔT2 obtained by the subtractor 40 is inputted to the high-low monitor switch 41, and the signal 41a of "1" is outputted from the high-low monitor switch 41 to the on-delay timer 42 when ΔT2>0. When the signal 41a of "1" is outputted from the high-low monitor switch 41 to the on-delay timer 42 over the predetermined time period, the signal 42a of "1" is outputted from the on-delay timer 42 to the AND circuit 43 after the predetermined time period passes. The boiler fuel cutoff signal 34 is inputted through the NOT circuit 44 to the AND circuit 43; specifically, even in a situation that the operation of the boiler body 1 is not to be urgently stopped (in the case where the boiler fuel cutoff signal 34 is "0" and the signal outputted from the NOT circuit 44 is "1"), if the signal 42a of "1" is outputted from the on-delay timer 42, outputted are the opening signals 26a and 28a from the AND circuit 43 through the OR circuit 39 to the inlet and outlet cutoff valves 26 and 28, respectively, and the start signal 25a to the steam production preventive pump 25.

Specifically, even in the situation that the operation of the boiler body 1 is not to be urgently stopped, when the outlet feed-water temperature 31a exceeds the outlet feed-water saturation temperature 33a, the inlet and outlet cutoff valves 26 and 28 are opened and the steam production preventive pump 25 is actuated. In this connection, the low-pressure feed-water is guided, by the operation of the booster pump 23, to the flue gas cooler 6 in the manner branched from the discharge side of the first low-pressure feed-water heater 15 and the low-pressure feed-water heat exchanged in the flue gas cooler 6 with the flue gas is joined to the discharge side of the second low-pressure feed-water heater 16. In addition, the low-pressure feed-water is fed from the bypass line 24 through the low-pressure feed-water branch line 22 into the flue gas cooler 6, is returned through the steam production preventive water circulation line 27 to the feed-water entry side of the condenser 12, is cooled by the condenser 12 and is circulated so that an amount of the low-pressure feed-water into the flue gas cooler 6 is increased. As a result, even in a normal operation of the boiler body 1, the low-pressure feed-water is prevented from being heated in the flue gas cooler 6 above the outlet feed-water saturation temperature 33a into steam production so that no water hammering occurs and there is no adverse effect on piping, valves and the like.

In the controller 32, the fact that the opening signals 26a and 28a are outputted to the inlet and outlet cutoff valves 26 and 28, respectively, and the start signal 25a is outputted to the steam production preventive pump 25 when the outlet feed-water temperature 31a measured by the feed-water temperature gauge 31 exceeds the outlet feed-water saturation temperature 33a based on the outlet feed-water pressure 30a measured by the feed-water pressure gauge 30, is effective for reliable prevention of steam production due to the low-pressure feed-water even in the situation that the operation of the boiler body 1 is not to be urgently stopped.

When both of the inlet gas and feed-water temperatures 29a and 31a are not more than the outlet feed-water saturation temperature 33a and both of the signals from the AND circuits 38 and 43 are "0", the signal outputted from the OR circuit 39 is "0". In this case, the signal outputted through the NOT circuit 45 is "1" so that the closing signals 26b and 28b are outputted to the inlet and outlet cutoff valves 26 and 28, respectively, and the stop signal 25b is outputted to the steam production preventive pump 25.

Thus, preliminarily prevented is steam production in the flue gas cooler 6 due to heat exchange with the high-temperature flue gas.

It is to be understood that a device for preventing steam from being produced in an flue gas cooler for an oxyfuel combustion boiler according to the disclosure is not limited to the above embodiment and that various changes and modifications may be made without departing from the scope of the disclosure.

REFERENCE SIGNS LIST 1 boiler body
6 flue gas cooler
12 condenser
13 condensate pump
14 boiler low-pressure feed-water system
15 low-pressure feed-water heater
16 low-pressure feed-water heater
18 boiler feed-water pump
22 low-pressure feed-water branch line
23 booster pump
24 bypass line
25 steam production preventive pump
25a start signal
25b stop signal
26 inlet cutoff valve
26a opening signal
26b closing signal
27 steam production preventive water circulation line
28 outlet cutoff valve
28a opening signal
28b closing signal
29 gas temperature gauge
29a inlet gas temperature
30 feed-water pressure gauge
30a outlet feed-water pressure
31 feed-water temperature gauge
31a outlet feed-water temperature
32 controller
33a outlet feed-water saturation temperature
34 boiler fuel cutoff signal
35 subtractor
36 high-low monitor switch
36a signal
37 on-delay timer
37a signal
38 AND circuit
39 OR circuit

The invention claimed is:

1. A device for preventing steam from being produced in a flue gas cooler for an oxyfuel combustion boiler with a boiler low-pressure feed-water system comprising a condenser, a condensate pump, a low-pressure feed-water heater and a boiler feed-water pump in the order named and wherein, in oxyfuel combustion, part of the low-pressure feed-water boosted in pressure by the condensate pump in the boiler low-pressure feed-water system is sent under pressure by a booster pump to the flue gas cooler where the low-pressure feed-water heat exchanged with flue gas is guided again to the boiler low-pressure feed-water system, comprising
a bypass line for connecting a feed-water discharge side of the condenser with a feed-water entry side of the flue gas cooler by bypassing the condensate and booster pumps,
a steam production preventive pump in the bypass line,
an inlet cutoff valve in the bypass line,
a steam production preventive water circulation line for connecting a feed-water discharge side of the flue gas cooler with a feed-water entry side of the condenser and
an outlet cutoff valve in the steam production preventive water circulation line,
when the boiler feed-water pump stops in boiler fuel cutoff, the inlet and outlet cutoff valves being opened and the steam production preventive pump being activated to cause water to flow through the bypass line to the flue gas cooler and return and circulate through the steam production preventive water circulation line to the condenser.

2. The device for preventing steam from being produced in the flue gas cooler for the oxyfuel combustion boiler as claimed in claim 1, further comprising
a gas temperature gauge for measuring an inlet gas temperature of the flue gas cooler, a feed-water pressure gauge for measuring an outlet feed-water pressure of the flue gas cooler and a controller for outputting opening signals to the inlet and outlet cutoff valves, respectively, and a start signal to the steam production preventive pump when the inlet gas temperature measured by the gas temperature gauge exceeds an outlet feed-water saturation temperature based on the outlet feed-water pressure measured by the feed-water pressure gauge and a boiler fuel cutoff signal is inputted.

3. The device for preventing steam from being produced in the flue gas cooler for the oxyfuel combustion boiler as claimed in claim 2, further comprising a feed-water temperature gauge for measuring an outlet feed-water temperature of the flue gas cooler, the controller being adapted to output the opening signals to the inlet and outlet cutoff valves, respectively, and the start signal to the steam production preventive pump when the outlet feed-water temperature measured by the feed-water temperature gauge exceeds the outlet feed-water saturation temperature based on the outlet feed-water pressure measured by the feed-water pressure gauge.

\* \* \* \* \*